US012798550B2

(12) United States Patent
Diamond et al.

(10) Patent No.: US 12,798,550 B2
(45) Date of Patent: Nov. 17, 2026

(54) METHODS AND SYSTEM FOR HIGH VOLTAGE LOAD ARBITRATION

(71) Applicant: Ford Global Technologies, LLC, Dearborn, MI (US)

(72) Inventors: Brendan Diamond, Naples, FL (US); Andrew E. Burt, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 18/808,794

(22) Filed: Aug. 19, 2024

(65) Prior Publication Data

US 2026/0048729 A1 Feb. 19, 2026

(51) Int. Cl.
*B60W 20/13* (2016.01)

(52) U.S. Cl.
CPC ..... *B60W 20/13* (2016.01); *B60W 2510/0638* (2013.01); *B60W 2510/101* (2013.01); *B60W 2510/244* (2013.01)

(58) Field of Classification Search
CPC ......... B60W 20/13; B60W 2510/0638; B60W 2510/101; B60W 2510/244
See application file for complete search history.

(56) References Cited

U.S. PATENT DOCUMENTS

| | | | | |
|---|---|---|---|---|
| 8,534,400 | B2 | 9/2013 | Stanek et al. | |
| 10,227,067 | B2 | 3/2019 | Bell et al. | |
| 10,486,684 | B2 | 11/2019 | Collins et al. | |
| 10,988,026 | B2 | 4/2021 | Mattmuller | |
| 2016/0230680 | A1* | 8/2016 | DeMarco | F02P 5/1504 |
| 2017/0129359 | A1* | 5/2017 | Dunlap | B60L 53/14 |
| 2017/0240162 | A1* | 8/2017 | Higashitani | B60W 10/06 |
| 2020/0047743 | A1* | 2/2020 | Burt | B60W 10/30 |
| 2021/0262428 | A1* | 8/2021 | Gibson | F02N 11/04 |
| 2021/0362702 | A1* | 11/2021 | Park | B60L 58/12 |
| 2022/0024332 | A1* | 1/2022 | Powell | B60L 58/20 |
| 2022/0041156 | A1* | 2/2022 | Imamura | B60K 6/445 |
| 2022/0089143 | A1* | 3/2022 | Bryan | B60W 50/14 |
| 2022/0242388 | A1* | 8/2022 | Kim | B60W 20/11 |
| 2024/0051430 | A1 | 2/2024 | Ferchau et al. | |
| 2024/0391451 | A1* | 11/2024 | Pcolka | B60W 50/0097 |
| 2025/0001999 | A1* | 1/2025 | Kharpuri | B60W 10/26 |
| 2025/0263063 | A1* | 8/2025 | Kharpuri | B60W 10/08 |

* cited by examiner

*Primary Examiner* — Mohamad O El Sayah
(74) *Attorney, Agent, or Firm* — McCoy Russell LLP

(57) ABSTRACT

A method for operating a hybrid vehicle that includes a high voltage and a low voltage bus is described. In one example, the method includes lowering a high voltage power consumption threshold so that high voltage bus power consumers may be identified as power consumers that may be deactivated as part of a load shedding operation. The high voltage power consumption threshold may be based on an amount of electric power that may be provided via an internal combustion engine and an electric machine.

16 Claims, 4 Drawing Sheets

METHODS AND SYSTEM FOR HIGH VOLTAGE LOAD ARBITRATION

FIELD

The present description relates to methods and a system for arbitrating loads of a high voltage electric power bus for a hybrid vehicle. The methods and systems may be beneficial when engine torque is constrained.

BACKGROUND

A hybrid vehicle may include a high voltage bus and a low voltage bus. The low voltage bus may be electrically coupled to a low voltage battery (e.g., a 12 VDC). The low voltage bus may transfer power between low voltage charging devices, low voltage storage devices, and low voltage consumers (e.g., vehicle instrumentation, lighting, infotainment systems, etc.). The high voltage bus may be electrically coupled to a traction battery (e.g., >400 VDC). The high voltage bus may transfer power between the traction battery, climate control system, a power distribution system for supplying electric power to external devices, and an electric machine that may provide propulsive effort. The high voltage bus may also be electrically coupled to the low voltage bus via a power converter so that electric energy may be transferred from the high voltage bus to the low voltage bus. However, there may be times when an engine and/or the electric machine may lack capacity to provide electric power to all power consumers.

It may be understood that the background above is provided to give some context to the systems and methods are described in the detailed description. The background is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

DETAILED DESCRIPTION

Figure 1:
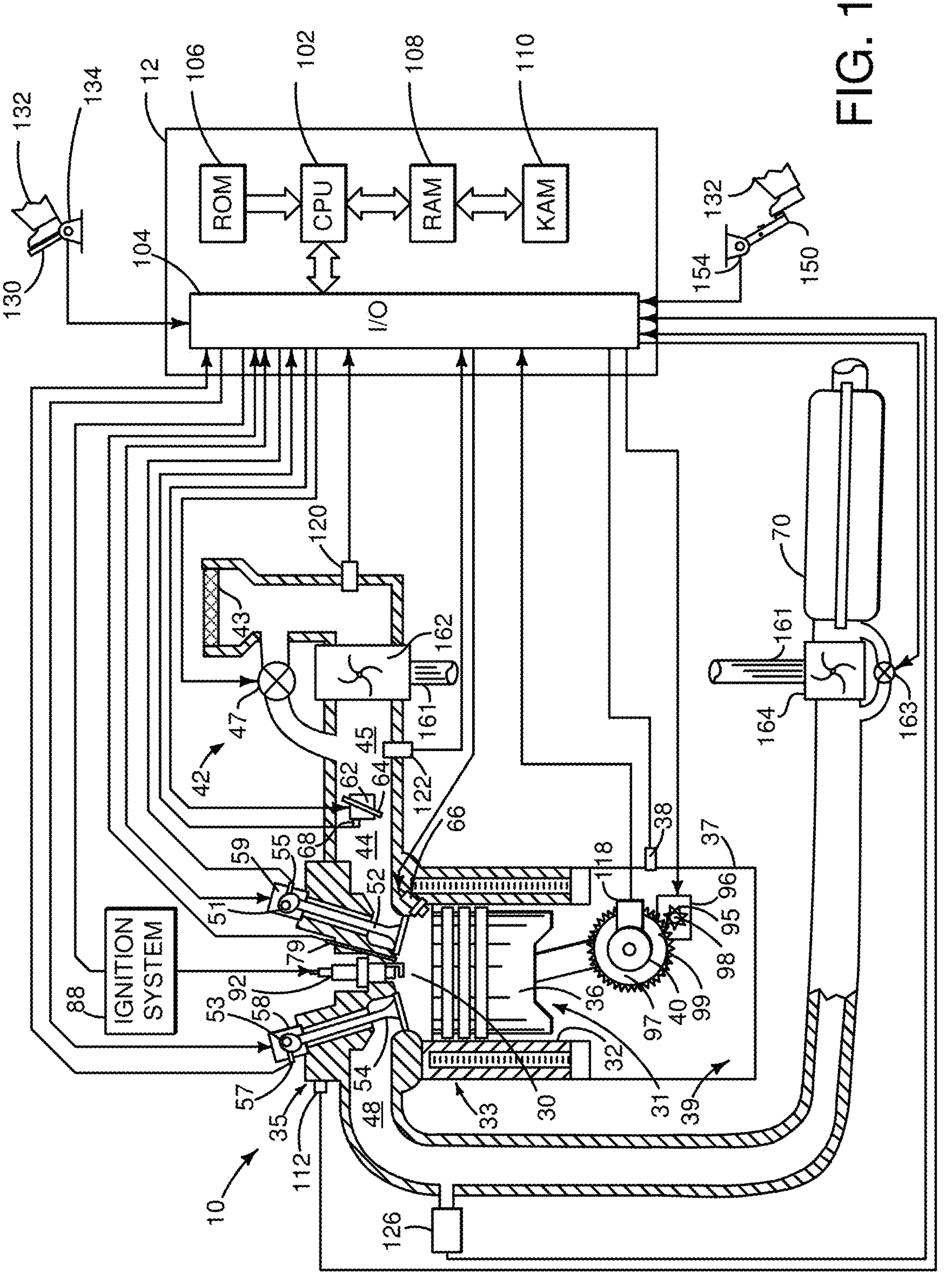
FIG. 1 shows a schematic diagram of an internal combustion engine.
Figure 2:
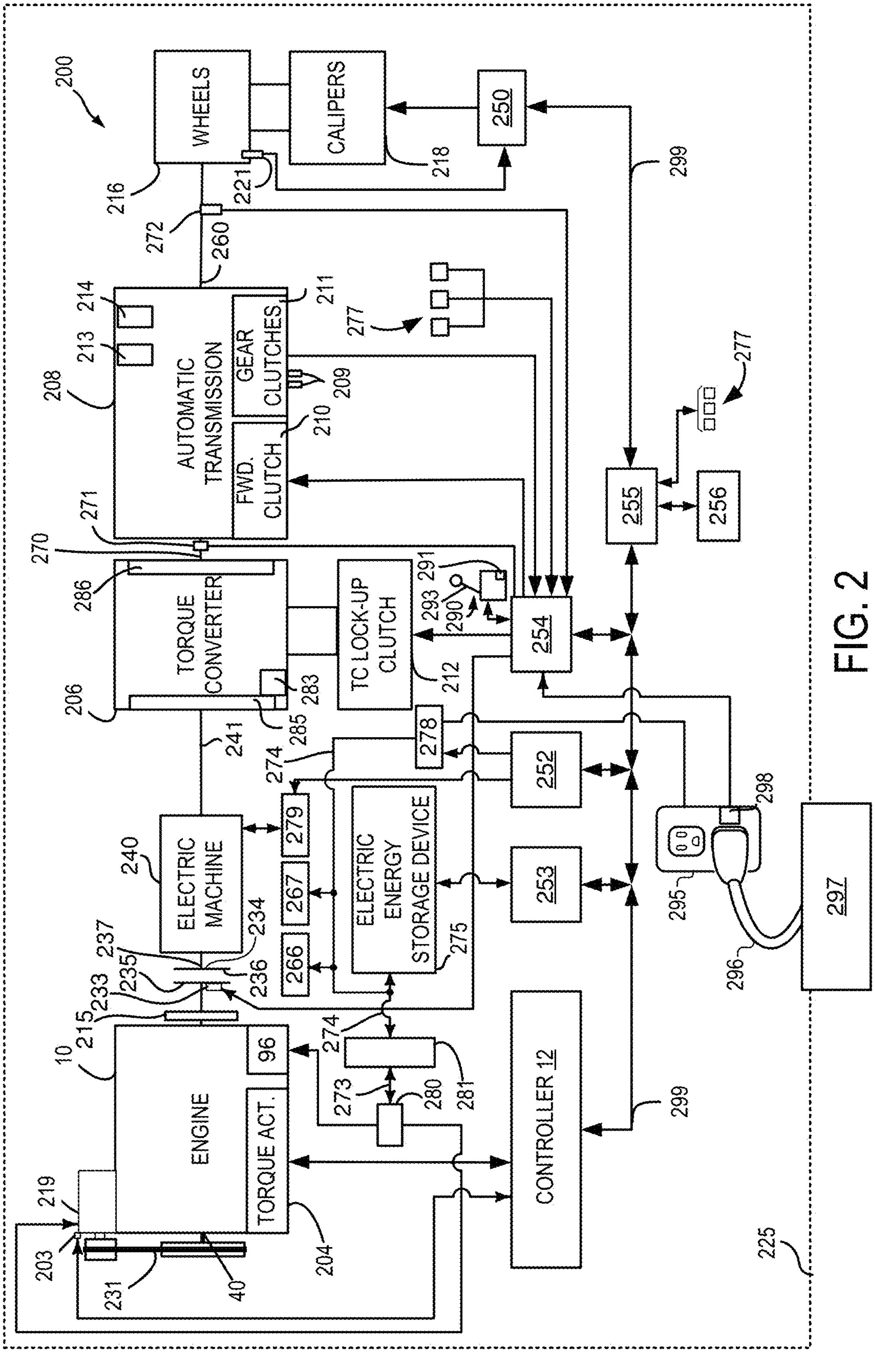
FIG. 2 shows a schematic diagram of an example vehicle driveline or powertrain including the internal combustion engine shown in FIG. 1.
Figure 3:
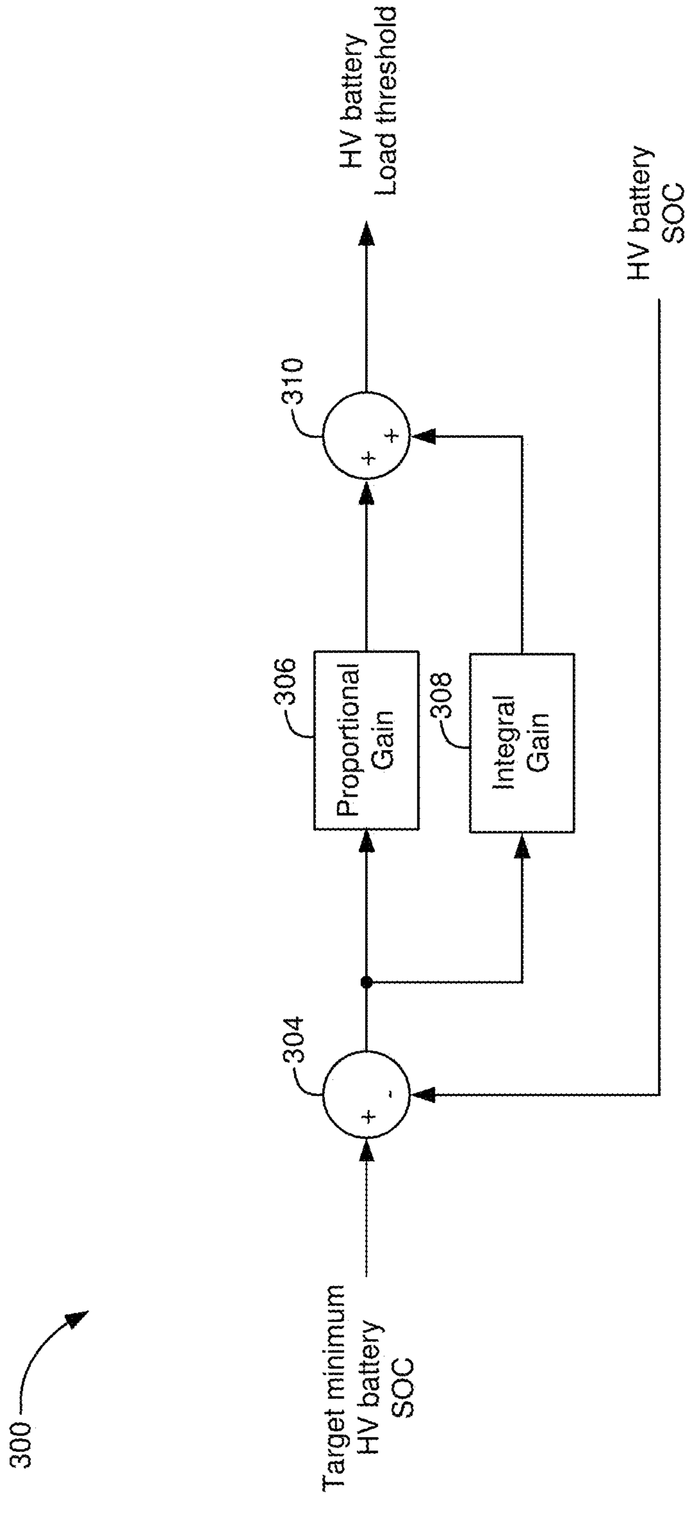
FIG. 3 shows an example proportional/integral controller for the powertrain shown in FIG. 3.

The present description is related to controlling power distribution of a high voltage bus and controlling high voltage battery state of charge (SOC) during operating conditions when high voltage battery SOC is low and an engine and/or electric machine lack capacity to supply the total amount of electric power being consumed via electric power consumers. The vehicle may be a hybrid vehicle that includes an internal combustion engine as shown in FIG. 1. The internal combustion engine may be part of a hybrid powertrain as shown in FIG. 2. The power flow in the hybrid vehicle may be controlled via a proportional/integral (PI) controller of the type that is shown in FIG. 3. The vehicle may operate according to the method of FIG. 4.

A hybrid vehicle may include a high voltage bus and a low voltage bus. Electric power may be transferred between the high voltage bus and the low voltage bus via a power converter. During some vehicle operating conditions, the engine and an electric machine may lack power output capacity to meet all electric power requests. In particular, the engine may be power constrained due to engine knock and/or pre-ignition at lower engine speeds. Consequently, electric power may be supplied to at least some power consumers via the high voltage battery when the electric power requests from the vehicle may not be met solely via the engine and electric machine. However, if high voltage SOC falls to less than a threshold SOC, high voltage battery degradation may result and/or electric power consumers may not receive their requested electric power.

The inventors herein have recognized the above-mentioned issues and have developed a method for operating a vehicle, comprising: shedding high voltage bus electric loads in response to high voltage bus electric loads being in excess of engine and electric machine electric power generation capacity for engine speeds less than a threshold speed.

By shedding or de-rating high voltage electrical loads that are electrically coupled to a high voltage bus, it may be possible to achieve the technical result of inhibiting reduction of battery state of charge when large high voltage loads are applied to a high voltage bus and an internal combustion engine and electric machine have insufficient capacity to supply enough electric power to meet demand of the large high voltage loads.

The present description may provide several advantages. Specifically, the approach may reduce a possibility of high voltage battery degradation. Further, the approach may enable charging of a high voltage battery when high voltage battery SOC is low and other high voltage loads are requesting high voltage power. In addition, the approach assesses high voltage battery depletion over several time intervals to increase confidence as to whether or not adjusting a high voltage load threshold may be expected to provide benefit.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to a driver demand pedal 130 for sensing force applied by human foot 132; a position sensor 154 coupled to vehicle caliper control pedal 150 for sensing force applied by foot 152, a measurement of engine manifold pressure (MAP) from pressure sensor 122 coupled to intake manifold 44; an engine position sensor 118 sensing a position of crankshaft 40; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and friction caliper controller 250. The controllers may communicate over controller area network (CAN) 299. Each of the controllers may provide information to other controllers such as power output thresholds (e.g., power output of the device or component being controlled not to be exceeded), power input thresholds (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded friction calipers). Further, the vehicle system controller 255 may provide commands to engine controller 12, electric machine controller 252, transmission controller 254, and caliper controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle slowing. The requested desired wheel power may be provided by vehicle system controller 255 requesting a first vehicle slowing power from electric machine controller 252 and a second vehicle slowing power from engine controller 12, the first and second powers providing a desired driveline vehicle slowing power at vehicle wheels 216. Vehicle system controller 255 may also request a friction caliper power via caliper controller 250. The vehicle slowing powers may be referred to as negative powers since they slow driveline and wheel rotation. Positive power may maintain or increase driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and caliper controller 250. Alternatively, the vehicle system controller 255 and the engine controller 12 may be a single unit while the electric machine controller 252, the transmission controller 254, and the caliper controller 250 are standalone controllers.

In this example, powertrain 200 may be powered by engine 10 and electric machine 240. In other examples, engine 10 may be omitted. Engine 10 may be started with an engine starting system shown in FIG. 1, via integrated starter/generator BISG 219, or via electric machine. A temperature of BISG windings may be determined via BISG winding temperature sensor 203. Electric machine 240 (e.g., high voltage (operated with greater than 30 volts) electrical machine) may also be referred to as a motor and/or a generator. Further, power of engine 10 may be adjusted via torque actuator 204, such as a fuel injector, throttle, etc.

BISG 219 is mechanically coupled to engine 10 via chain 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Power converter 281 (e.g., a bi-directional DC/DC converter) may transfer electrical energy from a high voltage bus 274 to a low voltage bus 273 or vice-versa. Low voltage battery 280 is electrically directly coupled to low voltage buss 273. Low voltage bus 273 may be comprised of one or more electrical conductors. Electric energy storage device 275 (e.g., a high voltage battery or traction battery) is electrically coupled to high voltage bus 274. Positive temperature coefficient (PTC) electric heater 266 and electrically driven climate control system (e.g., a heat pump) 267 are also electrically coupled to high voltage bus 274 and may receive electric power via high voltage bus 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to electric machine input shaft 237.

Electric machine 240 may be operated to provide power to powertrain 200 or to convert powertrain power into electrical energy to be stored in electric energy storage device 275 in a regeneration mode. Electric machine 240 is in electrical communication with energy storage device 275 via inverter 279. Inverter 279 may convert direct current (DC) electric power from electric energy storage device 275 into alternating current (AC) electric power for operating electric machine 240. Alternatively, inverter 279 may convert AC power from electric machine 240 into DC power for storing in electric energy storage device 275. Inverter 279 may be controlled via electric machine controller 252. Electric machine 240 has a higher output power capacity than starter 96 shown in FIG. 1 or BISG 219. Further, electric machine 240 directly drives powertrain 200 or is directly driven by powertrain 200. There are no gears, or chains to couple electric machine 240 to powertrain 200. Rather, electric machine 240 rotates at the same rate as powertrain 200. Electrical energy storage device 275 (e.g., high voltage battery or power source) may be a battery, capacitor, or inductor. The downstream side of electric machine 240 is mechanically coupled to the impeller 285 of torque converter 206 via shaft 241. The upstream side of the electric machine 240 is mechanically coupled to the disconnect clutch 236. Electric machine 240 may provide a positive power or a negative power to powertrain 200 via operating as a motor or generator as instructed by electric machine controller 252.

Power converter 278 (e.g., an inverter) is shown electrically coupled to electric energy storage device 275 via high voltage bus 274 and electrical output receptacle 295. Power converter 278 may convert DC power to AC power for operating external electric power consumer 297 (e.g., hand tools, entertainment systems, lighting, pumps, etc.). Power converter 278 may convert electric power from low voltage battery 280, electric power from electric energy storage device 275, or electric power from electric machine 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as electric machine 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction calipers 218. In one example, friction calipers 218 may be engaged in response to a human driver pressing their foot on a vehicle caliper control pedal (not shown) and/or in response to instructions within caliper controller 250. Further, caliper controller 250 may apply friction calipers 218 in response to information and/or requests made by vehicle system controller 255. In the same way, a frictional force may be reduced to wheels 216 by disengaging friction calipers 218 in response to the human driver releasing their foot from a caliper pedal, caliper controller instructions, and/or vehicle system controller instructions and/or information.

In response to a request to move vehicle 225, vehicle system controller may obtain a driver demand power or power request from a driver demand pedal or other device. Vehicle system controller 255 then allocates a fraction of the requested driver demand power to the engine and the remaining fraction to the electric machine or BISG. Vehicle system controller 255 requests the engine power from engine controller 12 and the electric machine power from electric machine controller 252. If the electric machine power plus the engine power is less than a transmission input power threshold (e.g., a power input threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative electric machine power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and friction calipers 218 provided via engine controller 12, electric machine controller 252, transmission controller 254, and caliper controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine speed reducing power or negative engine power may be provided by rotating the engine with the engine generating power that is insufficient to rotate the engine. Thus, the engine may generate a slowing power via operating at a low power while combusting fuel, with one or more cylinders deactivated (e.g., not combusting fuel), or with all cylinders deactivated and while rotating the engine. The amount of engine slowing power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from field and/or armature windings of electric machine 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254, engine controller 12, and vehicle system controller 255, may also receive addition transmission information from sensors 277, which may include but are not constrained to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Caliper controller 250 receives wheel speed information via wheel speed sensor 221 and vehicle slowing requests from vehicle system controller 255. Caliper controller 250 may also receive vehicle caliper control pedal position information from caliper application pedal sensor 154 shown in FIG. 1 directly or over CAN 299. Caliper controller 250 may provide slowing responsive to a wheel power command from vehicle system controller 255. Caliper controller 250 may also provide anti-lock and vehicle stability caliper activation to increase vehicle stability. As such, caliper controller 250 may provide a wheel power threshold (e.g., a threshold negative wheel power not to be exceeded) to the vehicle system controller 255 so that negative ISG power does not cause the wheel power threshold to be exceeded. For example, if caliper controller 250 issues a negative wheel torque threshold of 50 N-m, electric machine power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; an electric machine; a traction battery; a high voltage bus electrically coupling the electric machine and the traction battery; a controller including executable instructions stored in non-transitory memory that cause the controller to lower a high voltage load threshold in response to a state of charge (SOC) of the traction battery depleting over a plurality of time intervals. In a first example, the vehicle system further comprises additional executable instructions stored in non-transitory memory that cause the controller to lower the high voltage load threshold via a proportional/integral (PI) controller. In a second example that may include the first example, the vehicle system includes where the high voltage load threshold is output of the PI controller, and where a minimum target traction battery SOC is an input to the PI controller. In a third example that may include one or both of the first and second examples, the vehicle system includes where the high voltage load threshold is an amount of power that may be transferred via the high voltage bus. In a fourth example that may include one or more of the first through third examples, the vehicle system includes where the high voltage load threshold is based on a maximum electric load supported via the internal combustion engine and the electric machine. In a fifth example that may include one or more of the first through fourth examples, the vehicle system includes where the high voltage load threshold is further based on low voltage bus load and a buffer load. In a sixth example that may include one or more of the first through fifth examples, the vehicle system further comprises additional executable instructions that cause the controller to de-rate (e.g., constrain electric power flow to a device to less than a maximum rated power flow to the device) high voltage power consumers electrically coupled to the high voltage bus in response to the high voltage load threshold. In a seventh example that may include one or more of the first through sixth examples, the vehicle system further comprises a transmission coupled to the electric machine and additional executable instructions that cause the controller to lower the high voltage load threshold while the transmission is engaged in drive.

Referring now to FIG. 3, a block diagram of an example proportional/integral (PI) controller for engine torque constrained based high voltage load arbitration is shown. The PI controller 300 includes receives a target minimum high voltage battery state of charge (SOC). The target minimum high voltage battery SOC is a lowest SOC level that the high voltage battery is purposefully controlled to realize the desired vehicle performance and high voltage battery energy. The target minimum high voltage battery SOC is input to junction 304 where the present high voltage battery (e.g., the traction battery) SOC is subtracted from the target minimum high voltage battery SOC. The output of junction 304 is input to proportional gain block 306 and integral gain block 308. The proportional gain block 306 multiplies a value that is output by junction 304 via a real number. The real number may be a fixed value or the value of the real number may be a function of operating conditions such as battery temperature. Proportional gain block 306 supplies the result of the multiplication to junction 310. The integral gain block 308 numerically integrates the output from junction 304 and supplies the result of the numerical integration to junction 310. Junction 310 sums the output of the proportional gain block 306 and the output of integral gain block 308. The output of junction 310 is a high voltage load threshold (e.g., a maximum amount of power that the engine, electric machine, and/or battery may output at their present operating conditions).

Figure 4:
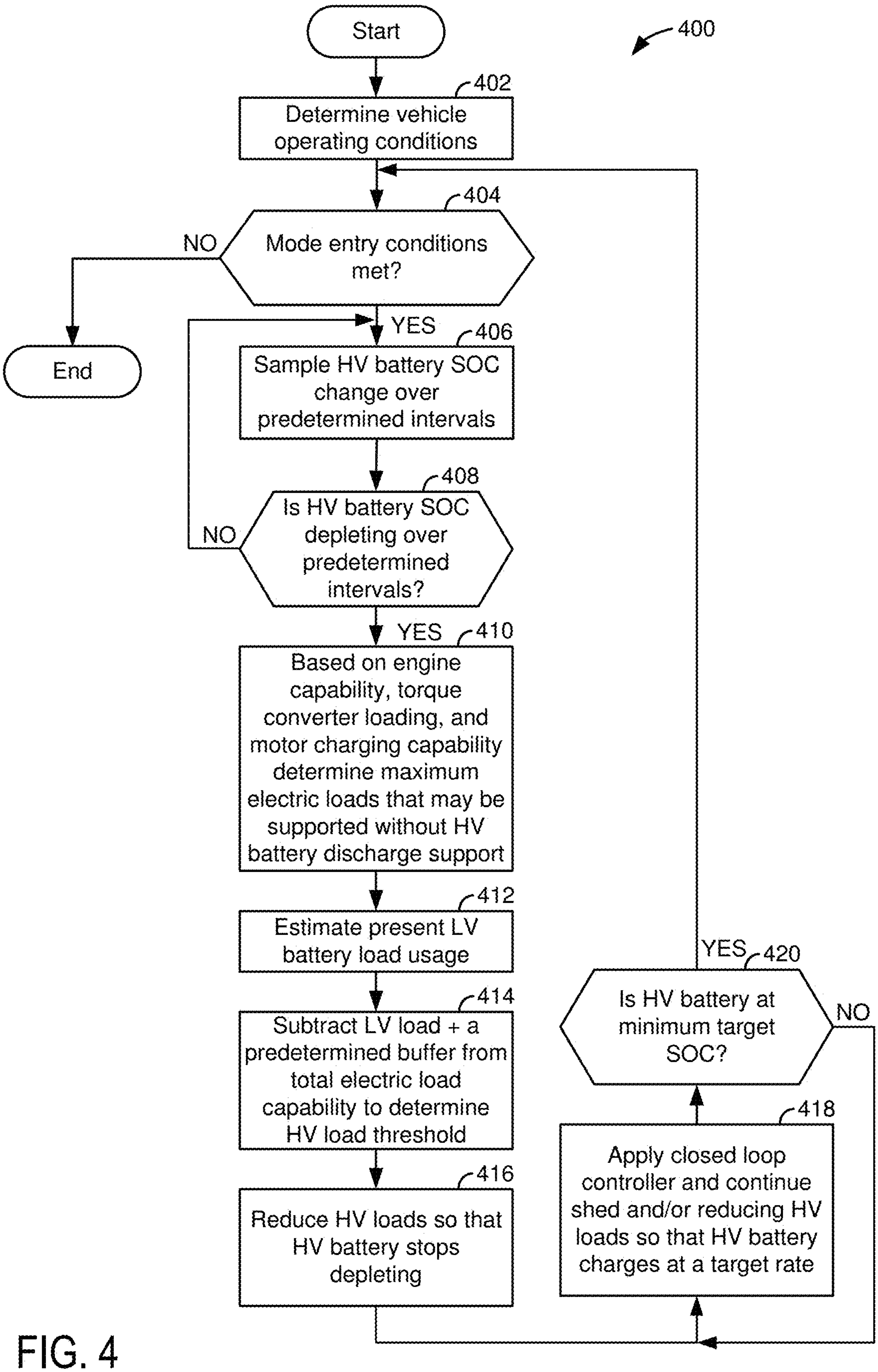
FIG. 4 shows a flowchart of an example method for arbitrating electric power during select vehicle operating conditions.

Referring now to FIG. 4, a flowchart of a method for arbitrating electric power of a hybrid vehicle during select vehicle operating conditions is shown. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device.

At 402, method 400 determines vehicle operating conditions. Vehicle operating conditions may be determined or estimated via the various sensors described herein. Vehicle operating conditions may include, but are not constrained to high voltage battery SOC, engine torque, engine speed, vehicle speed, high voltage battery voltage, high voltage battery current, low voltage battery voltage, low voltage battery current, catalyst temperature, driver demand torque, engine temperature, and ambient temperature and pressure. Method 400 proceeds to 404.

At 404, method 400 judges if selected conditions have been met to activate engine torque constrained based high voltage load arbitration for a hybrid vehicle. In one example, selected conditions may include vehicle speed being less than a threshold speed, the internal combustion engine operating within a predetermined percentage of a maximum available engine torque for the present engine speed, high voltage battery SOC being depleted beyond a predetermined threshold, and the vehicle being engaged in drive, park, or neutral. If so, the answer is yes and method 400 proceeds to 406. Otherwise, the answer is no and method 400 proceeds to exit.

At 406, method 400 samples (e.g., measures and/or determines) the high voltage battery SOC change over a plurality of predetermined time intervals. For example, method 400 may monitor and track high voltage battery SOC change over the following time intervals: ten seconds, thirty seconds, sixty seconds, three hundred seconds, and twelve hundred seconds. Method 400 proceeds to 408.

At 408, method 400 judges whether or not the high voltage battery SOC is depleting over predetermined time intervals. For example, method 400 may determine if the high voltage battery SOC is decreasing over a predetermined fraction or number of the predetermined time intervals. For example, if method 400 judges that high voltage battery SOC is depleting over the thirty, sixty, and three hundred second time intervals, method 400 may judge that the high voltage battery SOC is depleting over predetermined time intervals. If method 400 judges that the high voltage battery SOC is depleting over the predetermined time intervals, the answer is yes and method 400 proceeds to 410. Otherwise, the answer is no and method 400 returns to 406.

At 410, method 400 determines a maximum electric load (e.g., a maximum amount of power) that may be supported without discharging the high voltage battery. In one example, the maximum amount of power that may be supported without discharging the high voltage battery may be an amount of electric power that may be produced via the engine 10 and the electric machine 240. The maximum amount of power may be expressed via the following equation:

Totelec=Engpow (n, afr, temp, spk, camtime, bp, ambT) $\cdot\eta_{elec}$(nele, Tele) where Totelec is the total amount of electric power that may be provided by the engine and the electric machine under present operating conditions, Engpow is a function that returns engine power as a function of engine speed n, engine air/fuel ratio afr, engine temperature t, engine spark spk, engine cam timing camtime, barometric pressure bp, and ambient air temperature ambT, nelec is a function that returns the efficiency of the electric machine to convert mechanical power to electric power, nele is electric machine speed, and Tele is electric machine temperature. Method 400 proceeds to 412.

At 412, method 400 estimates present low voltage battery low voltage load. In one example, method 400 estimates the low voltage power usage by multiplying a voltage of the low voltage bus multiplied by an amount of current flow through the low voltage bus. Alternatively, method 400 may query low voltage load consumers and the low voltage load consumers may report their power consumption to method 400. Method 400 may then sum the power consumed by low voltage power consumers to determine the low voltage power consumption. Method 400 proceeds to 414.

At 414, method 400 subtracts the low voltage power consumption amount plus a predetermined buffer power amount from the total amount of electric power determined at step 410 to determine a high voltage load threshold amount (e.g., an amount of power that the engine, electric machine, and/or high voltage battery may supply to power consumers that receive electric power via the high voltage bus). Method 400 proceeds to 416.

At 416, method 400 reduces high voltage loads so that the high voltage battery SOC stops depleting. Method 400 may reduce high voltage loads according to a predetermined schedule and based on priority of the high voltage loads. For example, method 400 may lower climate control load before reducing power that is supplied to low voltage loads via the high voltage bus. The high voltage loads may be completely deactivated or power that is supplied to the high voltage loads may be incrementally reduced so that the high voltage battery SOC ceases depleting. The reduction in high voltage loads may stop after depletion of the high voltage battery SOC stops depleting. Method 400 proceeds to 418.

At 418, method 400 applies the PI controller shown in FIG. 3 so that the high voltage bus power consumption may be reduced to a state where the high voltage battery begins to charge from charge that is generated via the engine and the electric machine. By lowering the high voltage battery load threshold, power supplied to high voltage power consumers may be reduced. The flow of high voltage power supplied to high voltage power consumers may be reduced by constraining amounts of electric power that is supplied to high voltage electric power consumers (e.g., de-rating power supplied to electric power consumers). For example, an amount of electric power that is supplied to an electrically driven climate control system may be reduced from 4 kilowatts to 3.8 kilowatts. In some examples, high voltage power that is provided to high voltage power consumers may be weighted according to the device type of the high voltage power consumer. For example, high voltage power supplied to the low voltage bus vis power converter 281 may be weight with high priority than high voltage power that is supplied to a climate control system such that a fraction of power that is supplied to the low voltage bus may be greater than a fraction of power that is supplied to the climate control system. Alternatively, one or more of the high voltage power consumers may be deactivated (e.g., electric power load shedding) to reduce their high voltage power consumption in response to increasing the high voltage bus load threshold. Once the total electric load is low enough, charging of the high voltage battery may commence so that the high voltage battery SOC may be adjusted to the target minimum high voltage battery SOC. Method 400 proceeds to 420.

At 420, method 400 judges whether or not the high voltage battery is at or above the target minimum high voltage battery SOC. If so, the answer is yes and method 400 returns to 404. Otherwise, the answer is no and method 400 returns to 418.

In this way, method 400 may adjust electric power that is provided to high voltage power consumers in response to engine and electric machine electric power capacity so that a high voltage battery SOC may not be lowered more than may be desired. In addition, method 400 controls which power consumers may be given priority.

Thus, the method of FIG. 4 provides for a method for operating a vehicle, comprising: shedding high voltage bus electric loads in response to high voltage bus electric loads being in excess of engine and electric machine electric power generation capacity for engine speeds less than a threshold speed. In a first example, the method further comprises de-rating high voltage electric loads in response to the high voltage bus electric loads being in excess of engine and electric machine electric power generation capacity for engine speeds less than the threshold speed. In a second example that may include the first example, the method further comprises shedding the high voltage bus electric loads in further response to a high voltage battery SOC depleting over a plurality of different predetermined threshold amounts of time. In a third example that may include one or both of the first and second examples, the method further comprises shedding the high voltage bus electric loads in further response to an internal combustion engine of the vehicle operating within a predetermined threshold of a maximum available engine torque at a present engine speed. In a fourth example that may include one or more of the first through third examples, the method further comprises shedding the high voltage bus electric loads in further response to a transmission of the vehicle being in park or neutral. In a fifth example that may include one or more of the first through fourth examples, the method includes shedding the high voltage bus electric loads in further response to a high voltage load threshold being reduced. In a sixth example that may include one or more of the first through fifth examples, the method includes where the high voltage load is based on a low voltage bus load and a buffer low voltage bus load.

The method of FIG. 4 also provides for a method for operating a vehicle, comprising: in response to a high voltage battery state of charge (SOC) being less than a target minimum high voltage battery SOC, lowering a high voltage power consumption threshold. In a first example, the method further comprises lowering the high voltage power consumption threshold in further response to a charging capacity of an internal combustion engine and an electric machine being less than an actual total electric load of the vehicle. In a second example that may include the first example, the method includes where the total electric load of the vehicle includes a low voltage bus electric load. In a third example that may include one or both of the first and second examples, the method includes where the total electric load of the vehicle includes a high voltage bus electric load. In a fourth example that may include one or more of the first through third examples, the method includes where the high voltage bus electric load includes a power distribution system to supply electric power external to the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle having an engine and an electric machine, comprising:

shedding high voltage bus electric loads in response to high voltage bus electric loads being in excess of engine and electric machine electric power generation capacity for engine speeds less than a threshold speed and further in response to the engine of the vehicle operating within a predetermined threshold of a maximum available engine torque at a present engine speed.

2. The method of claim 1, further comprising de-rating high voltage electric loads in response to the high voltage bus electric loads being in excess of engine and electric machine electric power generation capacity for engine speeds less than the threshold speed.

3. The method of claim 1, further comprising shedding the high voltage bus electric loads in further response to a high voltage battery SOC depleting over a plurality of predetermined threshold amounts of time.

4. The method of claim 1, further comprising shedding the high voltage bus electric loads in further response to a transmission of the vehicle being in park or neutral.

5. The method of claim 1, shedding the high voltage bus electric loads in further response to a high voltage load threshold being reduced.

6. The method of claim 5, where the high voltage load threshold is based on a low voltage bus load and a buffer low voltage bus load.

7. A vehicle system, comprising:

an internal combustion engine;

an electric machine;

a traction battery;

a high voltage bus electrically coupling the electric machine and the traction battery;

a low voltage bus;

a bidirectional power converter electrically coupling the high voltage bus to the low voltage bus;

a controller including executable instructions stored in non-transitory memory that cause the controller to lower a high voltage load threshold in response to a state of charge (SOC) of the traction battery depleting over a plurality of time intervals, and further in response to the engine of the vehicle operating within a predetermined threshold of a maximum available engine torque at a present engine speed, wherein the high voltage load threshold is based on a maximum electric power generatable by the internal combustion engine and the electric machine, reduced by a low voltage bus load and a buffer load.

8. The vehicle system of claim 7, further comprising additional executable instructions stored in non-transitory memory that cause the controller to lower the high voltage load threshold via a proportional/integral (PI) controller.

9. The vehicle system of claim 8, where the high voltage load threshold is output of the PI controller, and where a minimum target traction battery SOC is an input to the PI controller.

10. The vehicle system of claim 7, where the maximum electric load is based on a current amount of power produced by the internal combustion engine and the electric machine.

11. The vehicle system of claim 7, further comprising additional executable instructions that cause the controller to de-rate high voltage power consumers electrically coupled to the high voltage bus in response to the high voltage load threshold.

12. The vehicle system of claim 11, further comprising a transmission coupled to the electric machine and additional executable instructions that cause the controller to lower the high voltage load threshold while the transmission is engaged in drive.

13. A method for operating a vehicle, comprising:

in response to a high voltage battery state of charge (SOC) being less than a target minimum high voltage battery SOC, a charging capacity of an internal combustion engine and an electric machine being less than an actual total electric load of the vehicle, and the engine of the vehicle operating within a predetermined threshold of a maximum available engine torque at a present engine speed: lowering a high voltage power consumption threshold via a proportional/integral (PI) controller that receives the target minimum high voltage battery SOC as an input and outputs the high voltage power consumption threshold; and constraining amounts of electric power supplied to high voltage electric power consumers based on the high voltage power consumption threshold.

14. The method of claim 13, where the actual total electric load of the vehicle includes a low voltage bus electric load.

15. The method of claim 14, where the actual total electric load of the vehicle includes a high voltage bus electric load.

16. The method of claim 15, where the high voltage bus electric load includes a power distribution system to supply electric power external to the vehicle.

* * * * *